United States Patent
Hoffmann et al.

(10) Patent No.: US 11,851,042 B2
(45) Date of Patent: Dec. 26, 2023

(54) METHOD AND CONTROLLER FOR CONTROLLING SLIP OF AT LEAST ONE WHEEL OF A VEHICLE

(71) Applicant: Robert Bosch GmbH, Stuttgart (DE)

(72) Inventors: Kai Hoffmann, Ilsfeld (DE); Marco Stumm, Ludwigsburg (DE); Michael Erden, Bietigheim-Bissingen (DE); Rami Scharbak, Benningen (DE); Valentin Loeffelmann, Dielheim (DE); Dirk Weidmann, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/907,222

(22) PCT Filed: Jul. 16, 2021

(86) PCT No.: PCT/EP2021/069977
§ 371 (c)(1),
(2) Date: Sep. 23, 2022

(87) PCT Pub. No.: WO2022/058067
PCT Pub. Date: Mar. 24, 2022

(65) Prior Publication Data
US 2023/0106328 A1      Apr. 6, 2023

(30) Foreign Application Priority Data
Sep. 21, 2020   (DE) .................. 10 2020 211 789.6

(51) Int. Cl.
*B60T 8/17*       (2006.01)
*B60T 8/175*      (2006.01)

(52) U.S. Cl.
CPC ................................. *B60T 8/175* (2013.01)

(58) Field of Classification Search
CPC ...................................................... B60T 8/175
(Continued)

(56) References Cited

U.S. PATENT DOCUMENTS

| | | | |
|---|---|---|---|
| 6,397,139 B1 | 5/2002 | Rodrigues et al. | |
| 6,542,806 B1 * | 4/2003 | Suhre ................... | B60W 10/06 701/82 |

(Continued)

FOREIGN PATENT DOCUMENTS

| | | |
|---|---|---|
| CN | 111452781 A | 7/2020 |
| DE | 102013205320 A1 | 10/2013 |

OTHER PUBLICATIONS

International Search Report for PCT/EP2021/069977, dated Oct. 12, 2021.

*Primary Examiner* — Mahmoud S Ismail
(74) *Attorney, Agent, or Firm* — NORTON ROSE FULBRIGHT US LLP; Gerard Messina (57) ABSTRACT

A method for controlling slip of at least one wheel of a vehicle. In the method, at least one parameter of an action to be performed is read out from a matrix using a slip state of the wheel if the slip state is outside a target slip region of the matrix, wherein, for reading this out, a data field of the matrix associated with the slip state is determined and the at least one parameter is read out from the data field, wherein, for performing the action, at least one actuator of the vehicle is actuated using the parameter.

12 Claims, 3 Drawing Sheets

(58) Field of Classification Search
USPC .......................................................... 701/82
See application file for complete search history.

(56) References Cited

U.S. PATENT DOCUMENTS

2017/0361850 A1* 12/2017 Lavertu ........... B60W 30/18172
2018/0244257 A1*  8/2018 Kneitz ................... B60K 6/448
2022/0178704 A1*  6/2022 Naef ................... B60L 15/2045

* cited by examiner

METHOD AND CONTROLLER FOR CONTROLLING SLIP OF AT LEAST ONE WHEEL OF A VEHICLE

FIELD

The present invention relates to a method for controlling slip of at least one wheel of a vehicle, and to a corresponding controller.

BACKGROUND INFORMATION

When a wheel of a vehicle is running on the ground, slip occurs between the wheel and the ground if, in the process, a force is transmitted to the ground in a running direction or counter to the running direction and/or transversely to the running direction. The slip can be expressed as a ratio of a rotational speed of the wheel to an actual movement speed of the wheel either in the running direction or counter to the running direction. A transmissible force increases up to a certain slip value. If this value is exceeded, the transmissible force decreases and the wheel starts to skid. In the running direction, the skidding can be referred to as wheel spin. Counter to the running direction, the skidding can be referred to as wheel lock.

In order to prevent wheel spin, the vehicle may include a traction control system. The traction control system models physical relationships on the vehicle and limits a drive torque on the wheel before the wheel starts to skid. In this case, the traction control system can actuate a brake system of the vehicle and/or a drive system of the vehicle to limit the drive torque.

In order to apply the traction control system on the vehicle, parameters of the traction control system are set by an application specialist in a complex optimization process.

SUMMARY

Using the approach according to the present invention, a method for controlling slip of at least one wheel of a vehicle, a corresponding controller, and, lastly, a corresponding computer program product and a machine-readable storage medium are provided. Advantageous developments and improvements to the approach according to the present invention are disclosed herein.

Advantageously, specific embodiments of the present invention can make it possible to reduce calculation complexity during an intervention by a traction control system of a vehicle. Therefore, the traction control system can respond with a short reaction time.

According to an example embodiment of the present invention, a method for controlling slip of at least one wheel of a vehicle is provided, wherein at least one parameter of an action to be performed is read out from a matrix using a slip state of the wheel if the slip state is outside a target slip region of the matrix, wherein, for reading this out, a data field of the matrix associated with the slip state is determined and the at least one parameter is read out from the data field, wherein, for performing the action, at least one actuator of the vehicle is actuated using the parameter.

Ideas for specific embodiments of the present invention can, inter alia, be considered to be based on the concepts and knowledge described in the following.

A slip state can describe a current state of slip on a wheel of a vehicle. The slip state can be captured on the wheel using at least one sensor. The slip state can also be determined for an axle of the vehicle. The slip state can then be captured by at least one sensor per wheel of the axle. Sensor signals from the sensors can be combined to determine the slip state.

A matrix can be a table. The matrix can comprise a plurality of data fields. A data field can contain one parameter or a plurality of parameters. A coordinate of a data field of the matrix can be associated with a numerical value of the slip state. A parameter can be a scaling value or a scaling factor. An action to be performed can be stored in the data field. An actuator can be a brake system of the vehicle. The actuator can also be a drive system of the vehicle. The brake system can be actuated on each individual wheel here. The drive system can be actuated on each individual axle as a rule, or can also be actuated on each individual wheel if there is an appropriate option to do so. To actuate the actuator, the parameter can be converted into a control signal or modulated to the control signal. A target slip region can be a segment of the matrix. The target slip region can comprise a plurality of data fields of the matrix. In the target slip region, the data fields can be empty.

According to an example embodiment of the present invention, a value pair composed of a relative speed value of the wheel and a relative acceleration value of the wheel can be formed for the slip state. Numerical values of the value pair can correspond to the coordinate of the data field to be selected. A relative speed value can represent a slip speed of the wheel. The slip speed can be a differential speed between the wheel and the ground. A relative acceleration value can represent a slip acceleration of the wheel. The slip acceleration can be a change in the slip speed. The slip speed and the slip acceleration can be determined by sensors and a reference speed of the vehicle. The reference speed can be available as a value in the vehicle.

According to an example embodiment of the present invention, the relative acceleration value can be ascertained using a curve for the relative speed value. The slip acceleration can be a gradient of the curve. The slip acceleration can be derived from the slip speed. Owing to this derivation, only one sensor is required on the wheel.

According to an example embodiment of the present invention, the relative speed value can be determined using a wheel speed value of the wheel and a further wheel speed value of a further wheel on an axle of the wheel. A wheel speed value can represent a wheel speed of the wheel. The wheel speed can be captured by a simple, reliable sensor on the wheel. For example, a wheel rotational-speed sensor can be used on the wheel to capture the wheel speed. The slip speed can be a speed difference between the wheel speed and the wheel speed of the other wheel on the axle.

According to an example embodiment of the present invention, the action to be actuated can be selected using the slip state. In particular, the action to be actuated can be dependent on a current change in the slip state. Different actions can be required to bring the slip state into the target slip region. For example, the wheel can be accelerated if it locks. By way of example, this can be carried out by increasing a drive torque or reducing a braking torque. Conversely, if the wheel spins, the drive torque can be decreased or the braking torque can be increased. If the current slip state is static, an action may be required that is different from that taken if the current slip state is changing dynamically.

Different actions can be stored in the data fields of the matrix. The action to be actuated can be read out from the data field associated with the slip state. Adjacent data fields can be associated with different actions at a transition from one slip state to another slip state.

According to an example embodiment of the present invention, a first value of a value pair characterizing the slip state can be compared with a row value region of the target slip region in order to determine a row region of the slip state in the matrix. In this process, an upper row region can be determined if the first value is greater than the row value region. A middle row region can be determined if the first value is within the row value region. A lower row region can be determined if the first value is less than the row value region.

According to an example embodiment of the present invention, a second value of the value pair can be compared with a column value region of the target slip region in order to determine a column region of the slip state in the matrix. In this process, a right-hand column region can be determined if the second value is greater than the column value region. A middle column region can be determined if the second value is within the column value region. A left-hand column region can be determined if the second value is less than the column value region.

The determined row region and the determined column region can characterize one of eight possible matrix segments of the matrix around the target region. The action to be actuated can be selected using the characterized matrix segment. The different matrix segments can be associated with different slip state regions. Transitions between different stored actions can be arranged at transitions between matrix segments.

According to an example embodiment of the present invention, a deviation of a subsequent slip state, captured after the action is performed, from the target slip region can be ascertained. A correction factor can be determined for the parameter using the deviation. The correction factor can be stored in the data field. If an action is performed using the at least one parameter stored in the data field, the slip state captured subsequently should reach the target slip region or change in the correct direction. If the slip state does not reach the target slip region or changes in the incorrect direction, the parameter may be unsuitable for that vehicle. A correction factor can change the parameter such that at least one improvement can be obtained in a subsequent cycle. If, in the subsequent cycle, a deterioration is obtained, a sign of the correction factor can be changed. By way of correction factors, the traction control system can be optimized in a fully automatic manner.

The method according to the present invention can, for example, be implemented in software or hardware or in a mixed form of software and hardware, for example in a controller.

The approach according to the present invention presented here further provides a controller which is configured to carry out, control, or implement the steps of a variant of the method presented here in corresponding apparatuses.

The controller can be an electrical device comprising at least one arithmetic logic unit for processing signals or data, at least one storage unit for storing signals or data, and at least one interface and/or communication interface for inputting or outputting data embedded in a communication protocol. The arithmetic logic unit can for example be a signal processor, a so-called system ASIC, or a microcontroller for processing sensor signals and outputting data signals on the basis of the sensor signals. The storage unit can for example be a flash memory, an EPROM, or a magnetic storage unit. The interface can be configured as a sensor interface for inputting the sensor signals from a sensor and/or as an actuator interface for outputting the data signals and/or control signals to an actuator. The communication interface can be configured to input or output the data wirelessly and/or in a wired manner. The interfaces can also be software modules which are provided on a microcontroller in addition to other software modules, for example.

Also advantageous is a computer program product or computer program comprising program code which can be stored on a machine-readable carrier or storage medium, such as a semiconductor memory, a hard-disk memory, or an optical memory, and is used for carrying out, implementing, and/or controlling the steps of the example method(s) of the present invention described above, in particular if the program product or program is executed on a computer or a device.

It should be noted that some of the possible features and advantages of the present invention are described herein with reference to different specific embodiments. A person skilled in the art recognizes that the features of the controller and the method of the present invention can be combined, adjusted, or interchanged in a suitable manner in order to arrive at further specific embodiments of the present invention.

BRIEF DESCRIPTION OF THE DRAWINGS

In the following, specific example embodiments of the present invention will be explained with reference to the figures, although neither the figures nor the description should be construed as limiting the present invention.

These figures are merely schematic and are not to scale. Identical reference signs denote identical or identically acting features.

DETAILED DESCRIPTION OF EXAMPLE EMBODIMENTS

Figure 1:
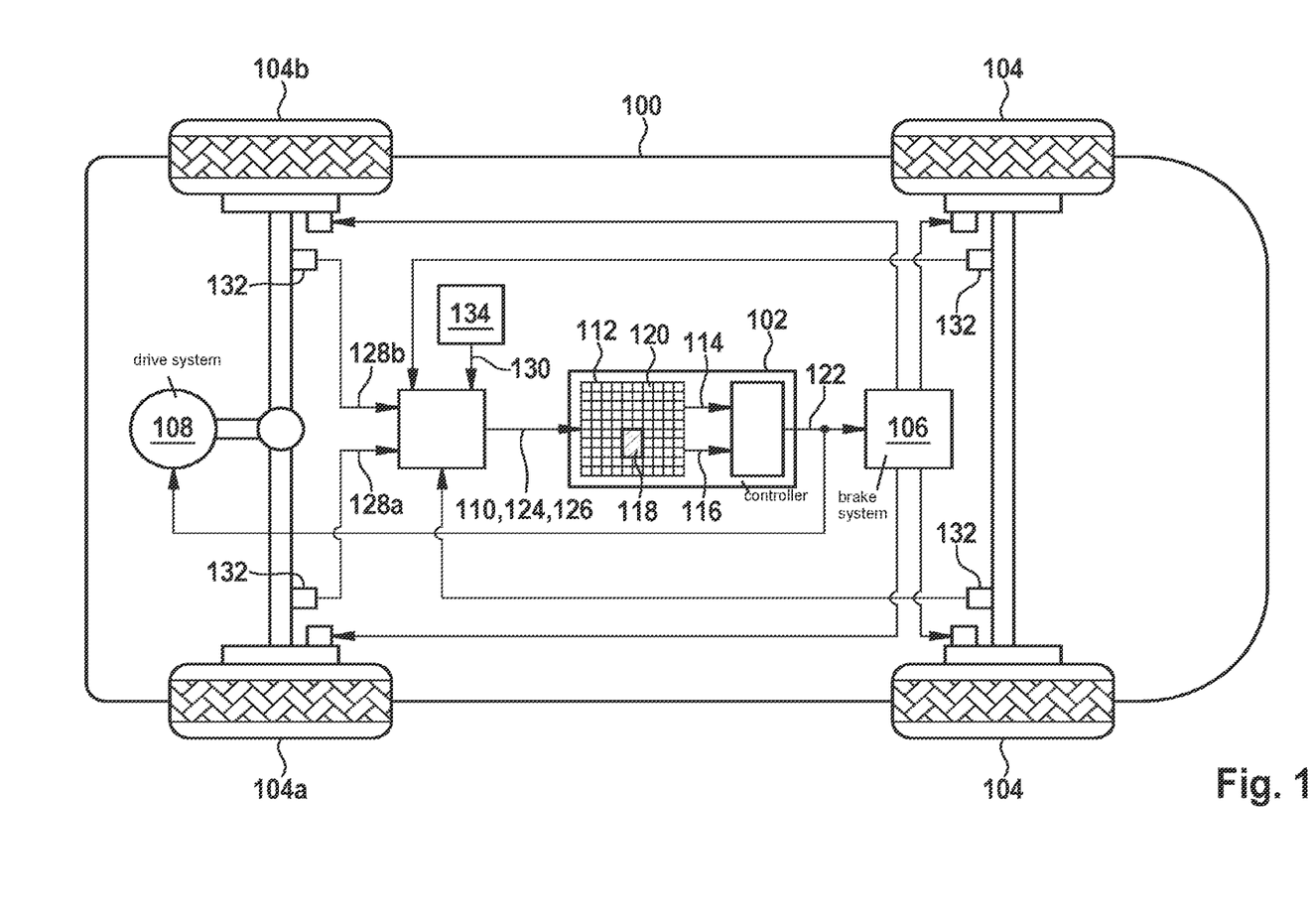
FIG. 1 shows a vehicle comprising a controller according to an exemplary embodiment of the present invention.

FIG. 1 shows a vehicle 100 comprising a controller 102 according to an exemplary embodiment. The controller 102 is configured to control slip on wheels 104 of the vehicle 100. The controller 102 is in particular configured to control drive slip on driven wheels 104 of the vehicle 100. The controller 102 can also be used to control brake slip on the driven wheels 104 and non-driven wheels of the vehicle 100. The controller 102 is connected to a brake system 106 of the vehicle 100, which brake system acts on the wheels 104. The controller 102 is likewise connected to a drive system 108 of the vehicle 100, which drive system acts on the driven wheels 104.

The controller 102 inputs one slip state 110 per wheel 104 or per axle. Using the slip state 110, at least one parameter 114 of an action 116 to be performed is read out from a matrix 112 in the controller if the slip state 110 is outside a target slip region 118 of the matrix 112. In order to determine whether the slip state 110 is outside the target slip region 118, a data field 120 of the matrix 112 associated with the slip state 110 is determined and the parameter 114 is read out from the data field 120 if the data field 120 is outside the target slip region 118. If the data field 120 associated with the slip state 110 is within the target slip region 118, the data field 120 is not read out, since the slip state 110 is then not intended to be changed.

In order to perform the action 116, a control signal 122 for the brake system 106 and/or the drive system 108 is generated using the parameter 114. If the wheel 104 of which the slip state 110 is being observed currently has excessively high slip, a torque acting on the wheel 104 is reduced by the action 116. In this case, the parameter 114 specifies by how much the torque is reduced.

If the braking torque is too high, a braking pressure on the wheel 104 that is applied by the brake system 106 can be reduced as the action 116. In this case, the parameter 114 represents by how much the braking pressure is reduced. Alternatively or additionally, a drive torque that counteracts the braking torque can be generated or increased on the wheel 104 or the axle by the drive system 108 as the action 116. In this case, the parameter 114 represents by how much the drive torque is increased.

If the braking torque is too low, a braking pressure on the wheel 104 that is applied by the brake system 106 can be increased as the action 116. In this case, the parameter 114 represents by how much the braking pressure is increased.

If the drive torque is too high, a power output by the drive system 108 to the wheel 104 or the axle can be reduced as the action 116. In this case, the parameter 114 represents by how much the drive torque is intended to be reduced. Alternatively or additionally, a braking torque that counteracts the drive torque can be generated on the wheel 104 by the brake system 106 as the action 116. In this case, the parameter 114 represents by how much the braking torque is increased.

If the drive torque is too low, a power output by the drive system 108 to the wheel 104 or the axle can be increased as the action 116. In this case, the parameter 114 represents by how much the drive torque is increased.

The slip state 110 of the wheel 104 is then input again following the action 116 and a corresponding parameter 114 for a subsequent action 116 is read out from the matrix 112 if the slip state 110 is still outside the target slip region 118. The subsequent action 116 is actuated by a new control signal 122 for the brake system 106 and/or the drive system 108.

In one exemplary embodiment, when the slip state 110 is then input again, the success of the previously performed action 116 is verified. In particular, it is verified whether the parameter 114 has resulted in a desired improvement in the slip state 110. If the improvement is insufficient, the previously used parameter 114 and/or the action 116 is changed. In this case, the parameter 114 can be changed on the basis of a difference of the slip state 110 from desired slip states of the target slip region 118.

In one exemplary embodiment, the slip state 110 is two-dimensional and is composed of a relative speed value 124 of the wheel 104 and a relative acceleration value 126 of the wheel 104.

In one exemplary embodiment, the relative speed value 124 represents a difference between a wheel speed value 128 of the wheel 104 and a reference speed value 130 of the vehicle 100. The wheel speed value 128 is captured on the wheel 104 by a wheel speed sensor 132 of the vehicle 100. The reference speed value 130 is continuously updated by a state estimator 134 of the vehicle 100.

In one exemplary embodiment, the relative speed value 124 represents a difference between a left-hand wheel speed value 128a of the left-hand wheel 104a of the axle and a right-hand wheel speed value 128b of the right-hand wheel 104b of the axle.

In one exemplary embodiment, different actions 116 are associated with different data fields 120. In this case, the action 116 to be performed and the associated parameter 114 are read out from the matrix 112 on the basis of the input slip state 110.

Figure 2:
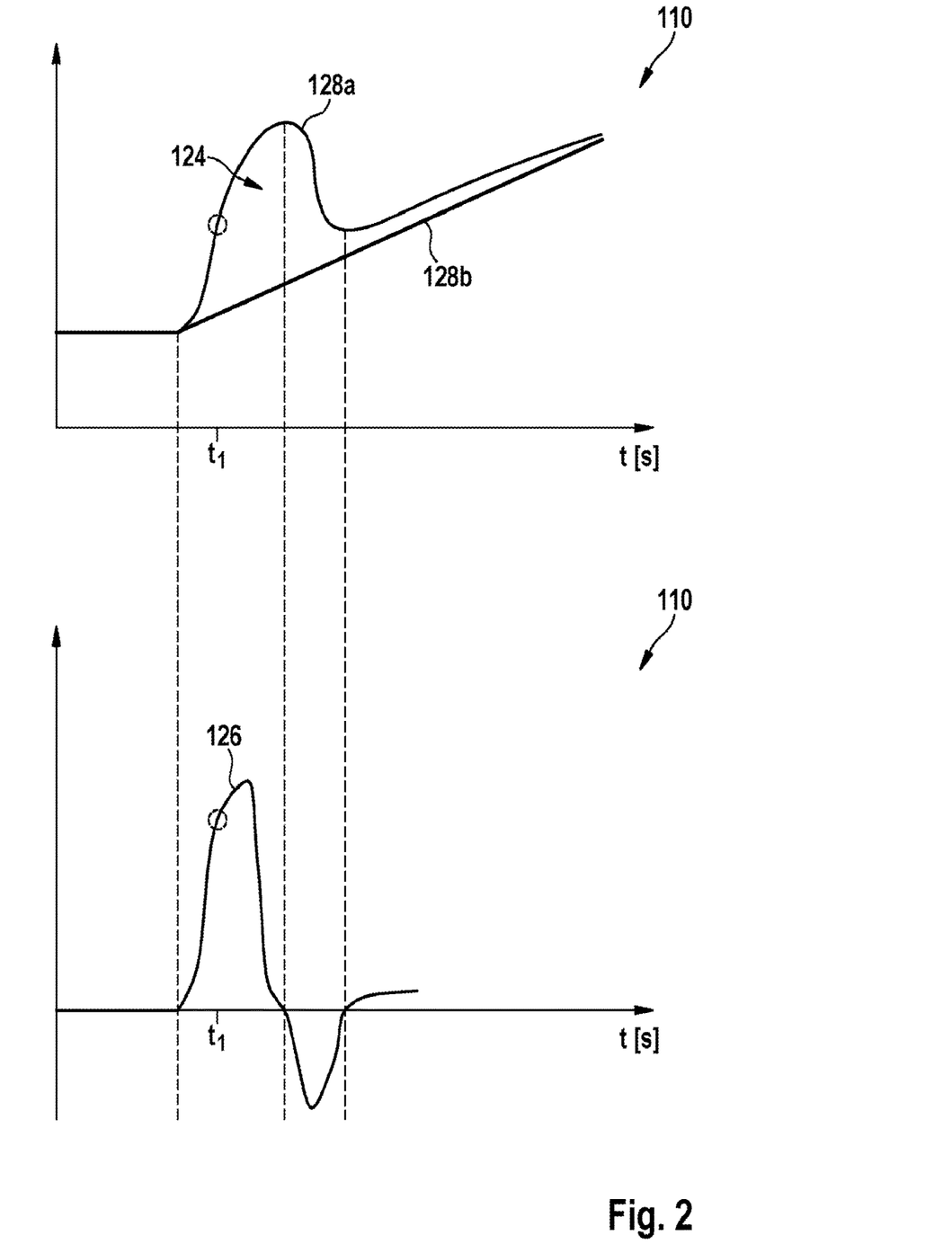
FIG. 2 shows a curve for a slip state.

FIG. 2 shows a time curve for a slip state 110. The slip state 110 is two-dimensional and is shown in two time-correlated graphs, one above the other. Both graphs have the time t in seconds plotted on the x axis. The upper graph has a speed in m/s plotted on the y axis. The lower graph has an acceleration in $m/s^2$ plotted on the y axis. The upper graph shows curves for wheel speed values 128a, 128b. The lower graph shows a curve for a relative acceleration value 126.

At the start of the curves, the vehicle is driving at a constant speed. The vehicle then accelerates and the right-hand wheel speed 128b increases with a constant gradient. The left-hand wheel loses adhesion and starts to spin. The left-hand wheel speed value 128a increases with a significantly greater gradient than the right-hand wheel speed value 128b. A difference between the left-hand wheel speed value 128a and the right-hand wheel speed value 128b is the relative speed value 124. The relative speed value 124 increases rapidly once the left-hand wheel loses adhesion. This rapid increase is also represented in the curve for the relative acceleration value 126, since the relative acceleration value 126 is the derivation of the relative speed value 124 after the time t. As adhesion is lost, the relative acceleration value 126 likewise rapidly increases from zero. At the first inflection point of the curve for the relative speed value 124, the curve for the relative acceleration value 126 has a maximum. A maximum of the curve for the relative speed value 124 is reached when the left-hand wheel speed value 128a likewise reaches a maximum. At the maximum, the curve for the relative acceleration value 126 has a zero crossing. After the zero crossing, the curve for the relative acceleration value 126 has a minimum at a second point of inflection of the curve for the relative speed value 124.

A point in time t1 is plotted before the first point of inflection of the curve for the relative speed value 124 is reached. Therefore, the curve for the relative acceleration value 126 has not yet reached its maximum at the point in time t1.

Figure 3:
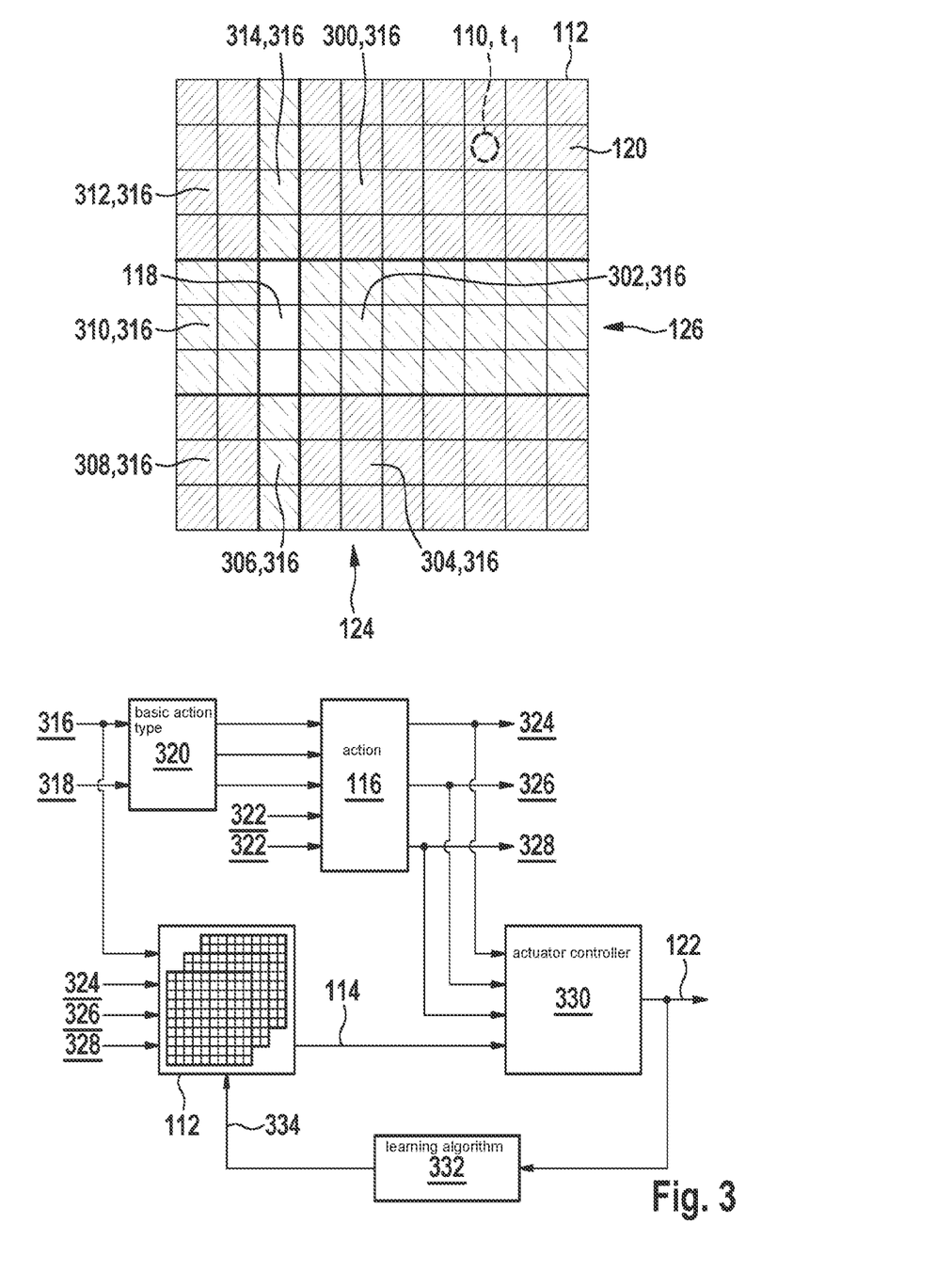
FIG. 3 is a schematic diagram of a traction control system according to an exemplary embodiment of the present invention.

FIG. 3 is a schematic diagram of a traction control system according to an exemplary embodiment. The traction control system can for example be implemented in a controller as shown in FIG. 1. A two-dimensional slip state 110 at the point in time t1 from FIG. 2 is highlighted in the matrix 112. The data fields 120 of the matrix 112 are all associated with different slip states 110. From left to right, the data fields 120 are associated with increasing relative speed values 124. From bottom to top, the data fields 120 are associated with increasing relative acceleration values 126. The target slip region 118 is likewise shown in the matrix 112. The target slip region 118 covers three data fields 120 of the matrix here.

In the matrix 112, eight matrix segments 300, 302, 304, 306, 308, 310, 312, 314 are shown in addition to the target slip region 118. In the first matrix segment 300, the data fields 120 are associated with higher relative speed values 124 and higher relative acceleration values 126 than the data fields 120 in the target slip region 118. In the second matrix segment 302, the data fields 120 are associated with higher relative speed values 124 than, and equal relative acceleration values 126 to, the data fields 120 in the target slip region 118. In the third matrix segment 304, the data fields 120 are associated with higher relative speed values 124 and lower relative acceleration values 126 than the data fields 120 in the target slip region 118. In the fourth matrix segment 306, the data fields 120 are associated with equal relative speed values 124 to, and lower relative acceleration values 126 than, the data fields 120 in the target slip region 118. In the fifth matrix segment 308, the data fields 120 are associated with lower relative speed values 124 and lower relative acceleration values 126 than the data fields 120 in the target slip region 118. In the sixth matrix segment 300, the data fields 120 are associated with lower relative speed values 124 than, and equal relative acceleration values 126 to, the data fields 120 in the target slip region 118. In the seventh matrix segment 300, the data fields 120 are associated with lower relative speed values 124 and higher relative acceleration values 126 than the data fields 120 in the target slip region 118. In the eighth matrix segment 300, the data fields 120 are associated with equal relative speed values 124 to, and higher relative acceleration values 126 than, the data fields 120 in the target slip region 118.

The data field 120 associated with the slip state 110 at the point in time t1 is in the first matrix segment 300. The desired slip states are in the target slip region 118. The eight matrix segments 300, 302, 304, 306, 308, 310, 312, 314 represent a static part 316 of the traction control system presented here.

Changes in the slip state 110 from run to run can be described by logic and represent a dynamic part 318 of the traction control system presented here.

A basic action type 320 is determined using the static part 316 and the dynamic part 318. A functional action type or the action 116 is determined using the basic action type 320 and further influencing variables 322. The action 116 can have three states 324, 326, 328. The first state 324 is acceleration. The second state 326 is braking. The third state 328 is stopping.

Using the action 116 and the static part 316, a parameter 114 is read out from the matrix 112 associated with the relevant state 324, 326, 328 of the action 116. The action 116 and the parameter 114 are used in an actuator controller 330 to generate a control signal 122 for the brake system and/or the drive system.

In one exemplary embodiment, a result of the actuation is evaluated in a learning algorithm 332 and correction factors 334 for the parameters 114 stored in the data fields 120 are created in order to optimize the traction control system in a fully automatic manner.

In the following, possible specific embodiments and configurations of the contact points presented herein are described again in different terms.

A state-action-based traction control system is presented.

The traction control system (TCS) is a functional element of an ESP system. One core function of the traction control system is that, when a vehicle is pulling away in the longitudinal direction, the wheels do not spin and vehicle requirements in terms of stability, maneuverability, and traction are met.

A conventional traction control system depends on physical modeling variables of the powertrain and on a speed reference. In this case, the speed reference is an estimate from an external function. The regulator of the conventional traction control system provides setpoint selections which are converted into manipulated actuator variables.

The conventional traction control system is a complex system and it takes approx. two years of work to properly understand it. Owing the high number of variants (>50 variants in a project), the conventional traction control system has high application complexity, with project durations of one to two years. The conventional traction control system requires an estimation of the drive torque acting on the wheels and the most accurate possible speed reference.

In the conventional system, the drive torque acting on the axles and wheels in the physical unit of newton-meters (Nm) is taken as a basis. This torque is modeled on the basis of a powertrain model using variables such as the rotational engine speed and the wheel speeds. When adjusting the conventional traction control system, optimal drive slips which provide ideal torque setpoint selections for the engine or braking torque selections for the brake system are calculated. The braking torques are then transformed back into braking pressure. As soon as the drive torque estimation is not functioning correctly or the external function of the speed reference is inaccurate, for example in the event of suboptimal application to the vehicle variant in question, the performance and/or accuracy decreases.

During application of the conventional system, there are approx. 500 adjustment parameters that directly or indirectly influence the system. It is necessary to internalize an interaction between parameters and the system in order to apply the function in a functional manner. This requires a great deal of time.

In the conventional system, any expertise built into the system is almost exclusively specific to the traction control system. A function developer, software developer, or application specialist trained on the conventional traction control system cannot simply assist with a different function (e.g., ABS or VDC).

In the approach presented here, the description of the system on the basis of physical-quantitative model variables is no longer of such central importance. In the approach presented here, correct triggering is sufficient. The approach presented here describes an intuitive system having low application complexity and a low number of variants.

As long as the triggering of the traction control system functions correctly, there are no performance issues. Owing to the state-action principle, the "state" is based on sensors, merely using measurements, and the "action" acts directly on the respective actuators, i.e., the engine and/or brake system.

The regulator parameters of the traction control system presented here are scaling values which influence the actuators, i.e., the engine and brake system, in an explicit manner via absolute values and/or in an implicit manner via delta values. These parameter values are learned fully automatically on the basis of learning algorithms by performing the most common traction control system maneuvers in accordance with a predetermined maneuver catalog. As a result, there is a direct relationship between the parameter values and the values for the "state," i.e., the wheel and axle behavior of the vehicle. As a result, the application specialist can subsequently carry out a customized post-application in a relatively accessible manner and/or intuitively.

The approach presented here describes an intuitive system. The regulator has been "re-thought." This approach does not attempt to describe a highly complex reality by modeling the vehicle, the tires, and the surroundings, or to control it using control technology, but instead, from the outset, the objective is set that it is neither possible nor desirable to describe the highly complex system. The approach is limited to the measured variables from sensors and the final control elements or actuators. Everything else is a generic intellectual approach.

In the approach presented here, knowledge of the definition of the "state" and the basic control aim of the traction control system are sufficient for understanding the system. No special expertise is required for applying the traction control function, since the software structure of this expertise is contained in the functional core in a generic manner and requires no further changes or adjustments. This also means that understanding of the software and of the function of the traction control system can be easily transferred to other functions, such as ABS or VDC.

In the state-action principle presented here, a "state" describes a state on the basis of which an action is performed due to a change in the state.

The "action" describes a direct influence on the actuator, i.e., the engine and/or the brake system.

The possible "states" and the target region are stored in a table. The speed slip of a wheel or axle is plotted on the x axis of the table. The acceleration of the wheel or axle is plotted on the y axis of the table.

A signal flow in the approach presented here is described in the following. Information regarding a speed and acceleration is input by a wheel speed sensor and processed using signal processing. The "state" is determined on the basis of the processed signals. In this process, the statics and dynamics of the "state" are ascertained. An action type, for example a pressure build-up or a torque reduction, is determined via an internal logic. The actuator variables are adjusted on the basis of the action type. The resulting actuator adjustment curves are characteristic of the state-action principle.

In the approach presented here, the learning algorithm is activated during application. In this process, parameter tables are updated. If an action was good, no change is made. If an action was bad, the parameters are varied.

The learning algorithm is deactivated in series. In this process, the parameter is read out from the table and the actuator is adjusted. Alternatively, learning in series is also possible.

The wheel or axle is controlled such that the system keeps the state to a control objective, the so-called target zone. As a result, a desired slip and a desired acceleration can be set. For instance, optimal traction can be obtained irrespective of the speed reference.

The speed slip represents a difference between the speed of the wheel (or axle) that is losing adhesion and the reference speed.

In this case, the same reference speed as in the conventional system can be used as the reference speed. The reference speed is an external function of a vehicle state estimation (VSE). Alternatively, however, a separate (simple) reference logic can also be implemented, since the focus is no longer on the quantitative description for the state-action principle. In the approach presented here, the reference speed is predominantly relevant for correctly triggering an instance of traction control. The approach presented here can be referred to as "slip-free," since a speed reference that is as accurate as that in the related art is not needed.

Lastly, it should be noted that terms such as "having," "comprising," etc., do not exclude any other elements or steps, and terms such as "a," "an," or "one" do not exclude a plurality.

What is claimed is:

1. A method for controlling slip of at least one wheel of a vehicle using a matrix formed of a plurality of data fields associated with respective slip states, the method comprising the following steps:
    when a current slip state of the at least one wheel is outside a target slip region of the matrix, reading out from the matrix at least one parameter of an action to be performed based on the current slip state of the wheel, the reading out including:
        selecting, from the plurality of data fields of the matrix, a data field associated with the current slip state; and
        reading out the at least one parameter from the selected data field; and
    actuating at least one actuator of the vehicle using the at least one parameter that has been read out, for performing the action;
    wherein the method includes at least one of the following two features (a)-(b)
        (a) (i) the matrix is two-dimensional, formed of rows and columns, (ii) each of the slip states is formed of a respective value pair composed of a respective value of a relative speed of the at least one wheel and a respective value of a relative acceleration of the at least one wheel, and (iii) the selecting is performed by using one of the relative speed and the relative acceleration to select from the rows of the matrix and using the other of the relative speed and relative acceleration to select from the columns of the matrix; and
        (b) (i) a balance of the data field of the matrix outside of the target slip region is divided into a plurality of selection regions depending on respective directions of difference of at least one value of the respective slip states from at least one value of one or more slip states of the target slip region so that each of the selection regions differs from each other one of the selection regions with respect to the directions, (ii) the method further comprises determining in which of the plurality of selection regions of the matrix surrounding the target slip region the selected data field is located, and (iii) the actuating is performed based on a result of the determination.

2. The method as recited in claim 1, wherein:
    (i) the matrix is two-dimensional, formed of the rows and columns;
    (ii) each of the slip states is formed of the respective value pair composed of the respective value of the relative speed of the at least one wheel and the respective value of the relative acceleration of the at least one wheel; and
    (iii) the selecting is performed by using the one of the relative speed and the relative acceleration to select from the rows of the matrix and using the other of the relative speed and relative acceleration to select from the columns of the matrix.

3. The method as recited in claim 2, wherein the relative acceleration value is ascertained using a curve for the relative speed value.

4. The method as recited in claim 2, wherein the relative speed value is determined using a wheel speed value of the wheel and a further wheel speed value of a further wheel on an axle of the wheel.

5. The method as recited in claim 1, wherein the action to be actuated is selected using the current slip state.

6. The method as recited in claim 5, wherein different actions are stored in data fields of the matrix, and the action to be actuated is read out from the data field associated with the current slip state.

7. The method as recited in claim 1, wherein a deviation of a subsequent slip state, captured after the action is performed, from the target slip region is ascertained, wherein a correction factor is determined for the parameter using the deviation and is stored in the data field.

8. The method as recited in claim 1, wherein:
    (i) the balance of the data field of the matrix outside of the target slip region is divided into the plurality of selection regions depending on the respective directions of difference of the at least one value of the respective slip states from the at least one value of the one or more slip states of the target slip region so that each of the selection regions differs from each other one of the selection regions with respect to the directions;

(ii) the method further comprises the determining of in which of the plurality of selection regions of the matrix surrounding the target slip region the selected data field is located; and (iii) the actuating is performed based on the result of the determination.

9. The method as recited in claim 8, wherein the at least one value includes a first value of a first slip characteristic and a second value of a second slip characteristic, and the directions of difference include a direction of difference of the first value from values of the first slip characteristic of the target slip region and a direction of difference of the second value from values of the second slip characteristic from values of the second slip characteristic of the target slip region, each of the plurality of selection regions having a positive or negative difference from the target slip region for at least one of the first and second slip characteristics.

10. A method for controlling slip of at least one wheel of a vehicle, the method comprising the following steps:
when a slip state of the at least one wheel is outside a target slip region of a matrix:
determining a data field of the matrix that is associated with the slip state; and
reading out, from the determined data field, at least one parameter of an action to be performed; and
using the at least one parameter that has been read out to actuate at least one actuator of the vehicle for performing the action;
wherein:
the action to be actuated is selected using the current slip state;
a first value of a value pair characterizing the slip state is compared with a row value region of the target slip region to determine a row region of the slip state in the matrix, such that:
an upper row region is determined when the first value is greater than the row value region;
a middle row region is determined when the first value is within the row value region; and
a lower row region is determined when the first value is less than the row value region;
a second value of the value pair is compared with a column value region of the target slip region to determine a column region of the slip state in the matrix, such that:
a right-hand column region is determined when the second value is greater than the column value region;
a middle column region is determined when the second value is within the column value region; and
a left-hand column region is determined when the second value is less than the column value region;
the determined row region and the determined column region characterize one of eight possible matrix segments of the matrix around the target slip region; and
the action to be actuated is selected using the characterized matrix segment of the eight possible matrix segments.

11. A controller configured to control slip of at least one wheel of a vehicle using a matrix formed of a plurality of data fields associated with respective slip states, the controller configured to:
when a current slip state of the at least one wheel is outside a target slip region of the matrix, read out from the matrix at least one parameter of an action to be performed based on the current slip state of the wheel, the reading out including:
selecting, from the plurality of data fields of the matrix, a data field associated with the current slip state; and
reading out the at least one parameter from the selected data field; and
actuate at least one actuator of the vehicle using the at least one parameter that has been read out, for performing the action;
wherein the controller includes at least one of the following two features (a)-(b)
(a) (i) the matrix is two-dimensional, formed of rows and columns, (ii) each of the slip states is formed of a respective value pair composed of a respective value of a relative speed of the at least one wheel and a respective value of a relative acceleration of the at least one wheel, and (iii) the selecting is performed by using one of the relative speed and the relative acceleration to select from the rows of the matrix and using the other of the relative speed and relative acceleration to select from the columns of the matrix; and
(b) (i) a balance of the data field of the matrix outside of the target slip region is divided into a plurality of selection regions depending on respective directions of difference of at least one value of the respective slip states from at least one value of one or more slip states of the target slip region so that each of the selection regions differs from each other one of the selection regions with respect to the directions, (ii) the controller is further configured to determine in which of the plurality of selection regions of the matrix surrounding the target slip region the selected data field is located, and (iii) the actuation is performed based on a result of the determination.

12. A non-transitory machine-readable storage medium on which is stored a computer program for controlling slip of at least one wheel of a vehicle using a matrix formed of a plurality of data fields associated with respective slip states, the computer program, when executed by a processor, causing the processor to perform a method comprising the following steps:
when a current slip state of the at least one wheel is outside a target slip region of the matrix, reading out from the matrix at least one parameter of an action to be performed based on the current slip state of the wheel, the reading out including:
selecting, from the plurality of data fields of the matrix, a data field associated with the current slip state; and
reading out the at least one parameter from the selected data field; and
actuating at least one actuator of the vehicle using the at least one parameter that has been read out, for performing the action;
wherein the method includes at least one of the following two features (a)-(b)
(a) (i) the matrix is two-dimensional, formed of rows and columns, (ii) each of the slip states is formed of a respective value pair composed of a respective value of a relative speed of the at least one wheel and a respective value of a relative acceleration of the at least one wheel, and (iii) the selecting is performed by using one of the relative speed and the relative acceleration to select from the rows of the matrix and using the other of the relative speed and relative acceleration to select from the columns of the matrix; and (b) (i) a balance of the data field of the matrix outside of the target slip region is divided into a plurality of selection regions depending on respective directions of difference of at least one value of the respective slip states from at least one value of one or more slip states of the target slip region so that each of the selection regions differs from each other one of the selection regions with respect to the directions, (ii) the method further comprises determining in which of the plurality of selection regions of the matrix surrounding the target slip region the selected data field is located, and (iii) the actuating is performed based on a result of the determination.

\* \* \* \* \*